(12) United States Patent
Mai et al.

(10) Patent No.: US 12,147,896 B2
(45) Date of Patent: *Nov. 19, 2024

(54) METHODS AND SYSTEMS FOR GEOMETRY-AWARE IMAGE CONTRAST ADJUSTMENTS VIA IMAGE-BASED AMBIENT OCCLUSION ESTIMATION

(71) Applicant: Adobe Inc., San Jose, CA (US)

(72) Inventors: Long Mai, San Jose, CA (US); Yannick Hold-Geoffroy, San Jose, CA (US); Naoto Inoue, Kanagawa (JP); Daichi Ito, Los Gatos, CA (US); Brian Lynn Price, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,525

(22) Filed: Apr. 6, 2023

(65) Prior Publication Data
US 2023/0244940 A1    Aug. 3, 2023

Related U.S. Application Data

(63) Continuation of application No. 16/691,110, filed on Nov. 21, 2019, now Pat. No. 11,663,467.

(51) Int. Cl.
*G06T 15/80* (2011.01)
*G06N 3/08* (2023.01)
(Continued)

(52) U.S. Cl.
CPC ............... *G06N 3/08* (2013.01); *G06T 5/50* (2013.01); *G06T 15/506* (2013.01); *G06T 15/80* (2013.01);
(Continued)

(58) Field of Classification Search
CPC .......... G06T 15/506; G06T 15/80; G06N 3/08
See application file for complete search history.

(56) References Cited

U.S. PATENT DOCUMENTS

2020/0066052 A1    2/2020  Antonsen et al.
2020/0098168 A1*   3/2020  Le ......................... G06N 20/00

OTHER PUBLICATIONS

Holden, Daniel, Jun Saito, and Taku Komura. "Neural network ambient occlusion." SIGGRAPH Asia 2016 Technical Briefs. 2016. 1-4. (Year: 2016).*

(Continued)

*Primary Examiner* — Ryan McCulley
(74) *Attorney, Agent, or Firm* — Shook, Hardy & Bacon L.L.P.

(57) ABSTRACT

Embodiments of the present invention provide systems, methods, and non-transitory computer storage media for generating an ambient occlusion (AO) map for a 2D image that can be combined with the 2D image to adjust the contrast of the 2D image based on the geometric information in the 2D image. In embodiments, using a trained neural network, an AO map for a 2D image is automatically generated without any predefined 3D scene information. Optimizing the neural network to generate an estimated AO map for a 2D image requires training, testing, and validating the neural network using a synthetic dataset comprised of pairs of images and ground truth AO maps rendered from 3D scenes. By using an estimated AO map to adjust the contrast of a 2D image, the contrast of the image can be adjusted to make the image appear lifelike by modifying the shadows and shading in the image based on the ambient lighting present in the image.

20 Claims, 8 Drawing Sheets

(51) Int. Cl.
*G06T 5/50* (2006.01)
*G06T 15/50* (2011.01)
(52) U.S. Cl.
CPC .............. *G06T 2207/10028* (2013.01); *G06T 2207/20081* (2013.01); *G06T 2207/20084* (2013.01)

(56) References Cited

OTHER PUBLICATIONS

Bavoil, L., et al., "Image-space horizon-based ambient occlusion", Proceeding SIGGRAPH '08 ACM SIGGRAPH 2008 talks, p. 1 (2008).

Li, Z., and Snavely, N., "Megadepth: Learning single-view depth prediction from internet photos", in Proceedings of the IEEE Conference on Computer Vision and Pattern Recognition, pp. 2041-2050 (2018).

Ranftl, R., et al., "Towards robust monocular depth estimation: Mixing datasets for zero-shot cross-dataset transfer", arXiv preprint arXiv:1907.01341v3, pp. 14 (Aug. 25, 2020).

Wang, T.-C., et al., "High-resolution image synthesis and semantic manipulation with conditional gans", in Proceedings of the IEEE conference on computer vision and pattern recognition, pp. 8798-8807 (2018).

Reinhard, E., et al., "Color transfer between images", IEEE Computer graphics and applications, vol. 21, No. 5, pp. 34-41 (2001).

Duan, J., et al., "Tone-mapping high dynamic range images by novel histogram adjustment", Pattern Recognition, vol. 43, No. 5, pp. 1847-1862 (2010).

Jimenez, J., et al., "Practical real-time strategies for accurate indirect occlusion", SIGGRAPH 2016 Courses: Physically Based Shading in Theory and Practice, pp. 15 (2016).

Yang, W., et al., "Ambient occlusion via compressive visibility estimation", in Proceedings of the IEEE Conference on Computer Vision and Pattern Recognition, pp. 3882-3889 (2015).

Liu, F., et al., "Multi-layer screen-space ambient occlusion using hybrid sampling", in Proceedings of the 12th ACM SIGGRAPH International Conference on Virtual-Reality Continuum and Its Applications in Industry, pp. 71-76 (2013).

Pouli, T., and Reinhard, E., "Progressive color transfer for images of arbitrary dynamic range", Computers & Graphics, vol. 35, No. 1, pp. 67-80 (2011).

Nunes, A., "Quick Tutorial: Local Contrast Enhancement with Unsharp Mask", Antonio Nunes Photography: Before and After Blog, Published on Jul. 15, 2014, Retrieved from Internet URL: https://blog.antonionunes.com/2014/07/quick-tutorial-local-contrast-enhancement-with-unsharp-mask/, accessed on Oct. 19, 2020, pp. 9.

"Adobe Photoshop User Guide: Image Adjustments", Adobe, Levels Overview, Retrieved from Internet URL: https://helpx.adobe.com/photoshop/using/levels-adjustment.html, accessed on Oct. 19, 2020, pp. 7.

Lin, C., et al., "Accelerated Detail-Enhanced Ambient Occlusion", IEEE International Conference on Image Processing (ICIP), pp. 529-533 (Sep. 2019).

Yuxiao, G., et al., "Inferring Ambient Occlusion from a Single Image", Journal of Computer Research and Development 56.2, vol. 385, pp. 1-18 (Feb. 1, 2019), Machine translation provided by Google Translate.

\* cited by examiner

METHODS AND SYSTEMS FOR GEOMETRY-AWARE IMAGE CONTRAST ADJUSTMENTS VIA IMAGE-BASED AMBIENT OCCLUSION ESTIMATION

CROSS-REFERENCE TO RELATED APPLICATION

This application is a continuation of U.S. application Ser. No. 16/691,110, filed on Nov. 21, 2019, the entire contents of which are herein incorporated by reference in their entirety.

BACKGROUND

Artists, including photographers and illustrators, can edit images and illustrations using specialized software products. For example, Adobe® Photoshop®, provided by Adobe Inc., enables artists to freely and easily achieve their image editing goals. Today, sophisticated image editing software allows artists to modify numerous features of images. These software programs enable users to transform minute details of an image to obtain a more visually desirable image. In some cases, editing particular features of a 2D image enhances the image's appearance to make it appear more 3D. For example, artists may desire to adjust the contrast (i.e., the difference in perceived brightness between image regions) of an image to improve how the image is displayed on a 2D scale. As a result, modern image editing software supports artists' creative endeavors when revising particular aspects of an image.

Typically, artists use their own knowledge, skill, and experience to manually refine features of an image using software as an aid in the process. However, in many instances, manually altering an image to make it appear more visually appealing or realistic requires advanced knowledge by artists with image editing experience. Manually modifying images, however, can be very time consuming and, in some cases, an artist may not be able to edit or adjust an image in a desired way. For instance, an artist may review an image, determine which aspects of the image to alter, make the alterations, and refine the image as necessary. Such a tedious process may be repeated for different portions or features of an image, resulting in extensive manual effort for editing image attributes.

SUMMARY

Embodiments of the present invention relate to, among other things, using and training a neural network to generate an ambient occlusion (AO) map of a two-dimensional (2D) image without any predefined three-dimensional (3D) scene information of the image. At a high level, embodiments of the present invention generate an estimated AO map of a 2D image so that the AO map may be combined with the original 2D image to adjust the amount of AO in the 2D image. By adding varying amounts of AO to a 2D image, the contrast can be adjusted so that the image appears more, or less, realistic and dynamic, depending on the desired affect. As a result, automatically generating an estimated AO map of an image that can be blended with the image avoids manual intervention by a user who would otherwise have to manually add shadows and shading.

In order to generate an estimated AO map of a 2D image without any predefined 3D scene information (e.g., 3D meshes, depth maps, normal maps, etc.), a neural network is optimally trained, tested, and validated using a synthetic dataset collected from a 3D graphics rendering engine. To make the neural network more geometry aware, a depth map of a training image and a linearly decayed AO ground truth map are combined and used as input into the network as a form of data augmentation during the training process. Using a discriminator network, the ground truth AO map can be used in conjunction with the estimated AO map to fine-tune the neural network until the trained neural network chooses the estimated AO map as the "real" map over the ground truth AO map. Once trained, an AO map of a single 2D image or 2D illustration can be automatically generated by the trained network without access to any known 3D scene geometry information. Accordingly, a generated AO map for a 2D image can be combined with the original image to create a more realistic and visually appealing 2D image.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
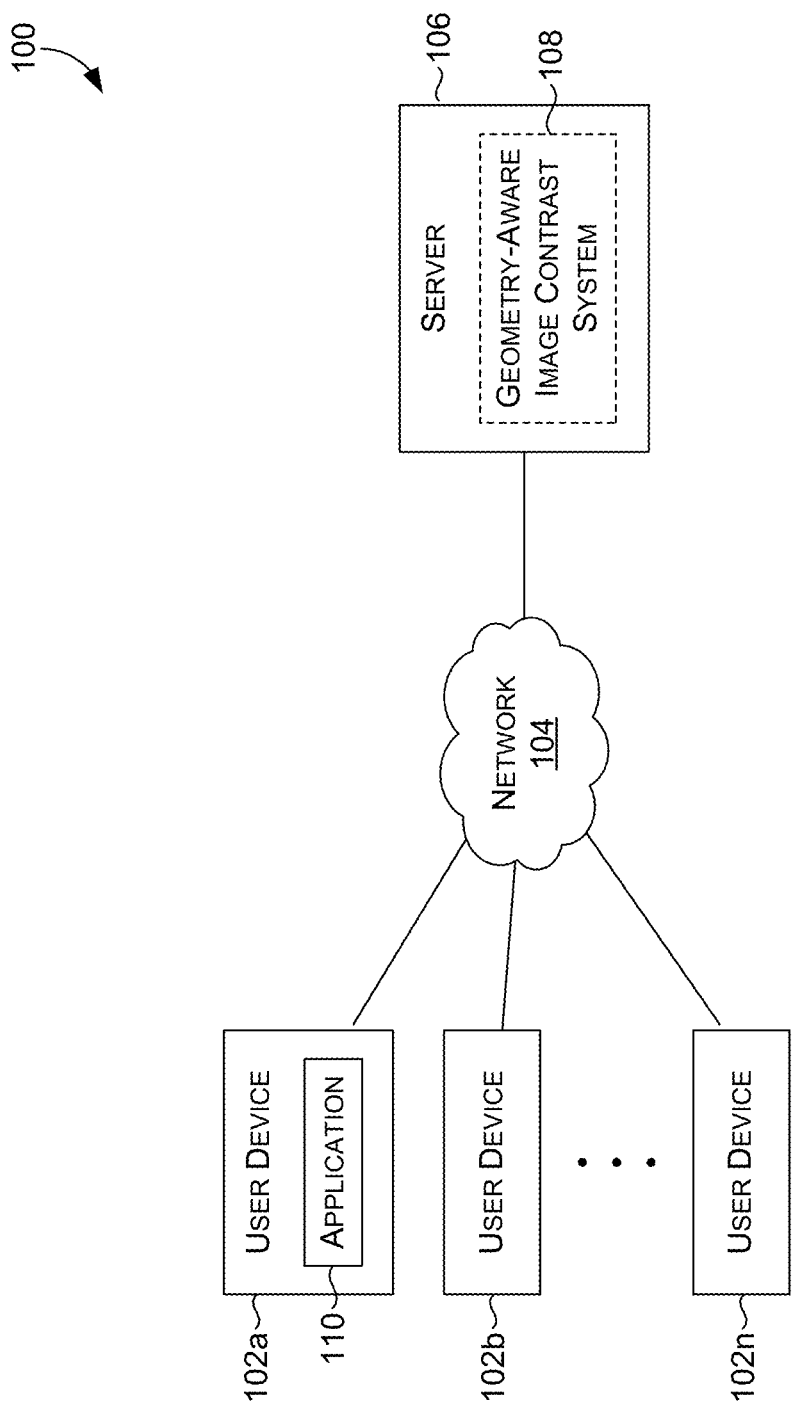
FIG. 1 is a block diagram of an exemplary computing system for geometry-aware image contrast adjustments to a 2D image, in accordance with embodiments of the present invention.

As a result of modern image editing software, artists, including photographers, illustrators, and other users are able to adjust particular features of an image to enhance the image's appearance. These software programs enable users to transform minute details of an image to obtain a more visually desirable image. For example, editing particular features of a two-dimensional (2D) image may enhance the image's appearance to make it appear more three-dimensional (3D). However, allowing users to manually modify numerous features in an image often requires sophisticated and deep understanding of the image editing software. Moreover, manually modifying images can be very time consuming. For instance, an artist may review an image, determine which aspects of the image to alter, make the alterations, and refine the image as necessary. Users may repeat such a tedious process for different portions or features of an image, resulting in extensive manual effort for editing image attributes.

As a result of this iterative process, artists use their own knowledge, skill, and experience to manually refine features of an image using software as an aid in the process. One such feature incorporated in software is a contrast adjustment component, a popular feature used by artists to alter the contrast of an image. Currently, if a user desires to adjust the contrast of an image (i.e., the difference in perceived brightness between regions of an image), the user would apply a traditional contrast filter. A typical contrast filter would make darker regions of an image even darker and, vice versa, make lighter images of the image even lighter. These existing methods either adjust the contrast of an image by leveraging brightness histograms and gradient masks of the image or by transferring lighting or colors from other reference images without direct consideration of the geometry present in the image. As a result, applying a traditional contrast filter does not enhance the realism of an image because proper shading or shadows are not modified in conjunction with the adjustments to the contrast.

To enable more lifelike effects of a 2D image, users often must manually paint darker brightness around areas in an image that should have physically attracted less light and increase the brightness in areas that are more exposed to light. For example, if an image of a room is displayed, typically, the corner of the room should be darker than the middle of the room because ambient light hits the center of the room more often than the corner of the room. Manually adjusting the brightness in different regions of an image is a time-consuming process that requires a high-level of artistic skill. As a result, there is a desire for automated image editing features that allow novice users with little artistic skill to produce high-quality images.

Classic contrast adjustment methods only emphasize the brightness of pixels in an image and do not take into account the 3D geometry of content and/or features in the image (e.g., darker objects will become darker). These methods apply contrast transformations globally and do not create a desired shading effect because traditional contrast filters are not aware of the geometry of objects in an image when adjusting the contrast. Moreover, even though ambient occlusion (AO) map estimation is a well-known technique used in 3D computer graphic applications, these existing AO map estimation techniques are used and developed in the context of 3D graphics rendering where the entire geometry of a scene (e.g., 3D meshes, depth maps, normal maps, etc.) is generated and available for use. However, these techniques do not work well for 2D images or 2D illustrations that lack the 3D geometric parameters relied on by these traditional techniques. In this regard, there is a need for a learning-based approach that enables AO map estimation from a single 2D image without any predefined 3D information to properly adjust the contrast of the image based on the geometry of objects and features in the image to acquire a more realistic image.

Accordingly, embodiments of the present invention automatically generate an estimated AO map from a single 2D image or illustration that can be used to adjust the contrast of the image, making the image appear more realistic. By generating an AO map using an AO estimation technique based on the 3D geometry of content in a 2D image, without any predefined 3D scene information, the AO map may be used to emphasize or exaggerate the geometry in the image. For example, if the input image is a 2D illustration, embodiments of the present invention can make objects in the illustration (e.g., desk, chair, room, house, etc.) appear more dynamic by blending the image with an AO map of the image to make the shadows and shading effects in the image appear more realistic. Thus, by automatically generating AO maps of an image, realistic contrast enhancements can be applied to the image in a user-friendly manner.

By automatically generating the appropriate AO maps for a given 2D image or 2D illustration based on the geometric information of content in the image, without any predefined 3D scene information, embodiments of the present invention can combine the appropriate AO map with the image to produce contrast enhancements for the image. The AO map for a 2D image or 2D illustration is generated by embodiments of the present invention using a trained neural network architecture (e.g., convolutional neural network (CNN)) that uses an AO estimation technique. In order to train the neural network, training data comprised of image and AO map pairs are generated by rendering synthetic scenes from graphics engines. To make the neural network more geometry aware, a depth map of a training image and a linearly decayed AO ground truth map are combined and used as input into the network as data augmentation during the training process. Once trained, an AO map of a single 2D image or 2D illustration can be automatically generated by the trained network without access to any known 3D scene geometry information.

Using the trained network to automatically generate the AO map for a 2D image or 2D illustration, a user can emphasize or exaggerate the content or scene information in their image or illustration in different ways. In some cases, an estimated AO map for an image can be applied universally to the entire image to make the image appear more dynamic. In other cases, an AO map can be used for making composite images appear more realistic. For example, putting a product image (e.g., cars, boxes, bottles, etc.) on a background image (e.g., road, table, etc.) is a common process for making images to be used in advertisements. However, when placing the product image on the background image, the proper shading or shadows between the product and background image are non-existent causing the image to look fake. As a result, embodiments of the present invention automatically generate an AO map for the composite image so it can be enhanced to make the entire image appear natural and coherent. In yet other instances, embodiments of the present invention may adjust the AO of the image to reduce the AO or magnify the AO to obtain a desired effect for the image. For example, having a sliding scroll bar or other UI adjustment tool, the AO of a 2D image can be precisely adjusted based on a user's preferences. Thus, an AO map can be used in a variety of ways to enhance the appearance of a 2D image or 2D illustration.

Advantageously, embodiments of the present invention can automatically adjust the AO contrast of a 2D image based on the geometry of content in the image using an estimated AO map, eliminating the need for manually adding shading, shadows, or other AO effects around content in the image. Because there is no 3D geometric information of a 2D image created in advance of generating an AO map, embodiments of the present invention are able to conserve resources and efficiently estimate the AO map of any given 2D image using a trained neural network. Accordingly, to obtain more realistic 2D images or illustrations, the contrast of any 2D image or illustration (composite or otherwise) can be properly adjusted or modified based on the geometry of the content in the 2D image or illustration by blending the 2D image or illustration with an estimated AO map.

Having briefly described an overview of aspects of the present invention, various terms used throughout this description are provided. Although more details regarding various terms are provided throughout this description, general descriptions of some terms are included below to provide a clear understanding of the ideas disclosed herein.

Contrast is the difference in luminance or color that makes an object (or its representation in an image or display) distinguishable. Said differently, it is the difference in perceived brightness between regions of an image.

Ambient occlusion (AO) generally refers to how the surface of features, objects, or other attributes of an image are exposed to the ambient lighting in the image. For example, if the image displays the inside of a box-shaped room, the corner of the room should be darker than the center the room because it has less of a chance to receive ambient light (e.g., natural light, artificial light, etc.) based on the placement of features such as a window or a lamp.

An AO map generally refers to grayscale representation of an image where the darker pixels indicate areas that receive less ambient light and the lighter pixels indicate areas that receive more ambient light based on the scene information of the image.

A scene or scene information generally refers to the content in an image (i.e., the features, objects, attributes, etc. located in an image).

Predefined scene information generally refers to any data structures that represent different features of an image (e.g., 3D meshes, depth maps, normal maps, etc.) generated in advance of any other processing of the image.

A two-dimensional (2D) image or 2D illustration generally refers to the spatial layout of the scene. For example, the two dimensions depicted in a 2D image or illustration are the length (i.e. height) and width and the objects in the picture are flat. The spatial layout dimension is separate from the color dimensions or similar feature dimensions of a 2D image or 2D illustration. Additionally, the time dimension in a video is not considered. A video would be considered a series of 2D images as opposed to a single 3D image where one dimension is time.

Example Geometry-Aware Image Contrast Environment

FIG. 1 depicts a block diagram of exemplary environment 100 suitable for use in implementing embodiments of the invention. Generally, environment 100 is suitable for geometry-aware contrast adjustments of a 2D image using an AO map, and among other things, facilitates automatically generating an AO map for a 2D image without any 3D information of the 2D image generated in advance of the AO map. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1 is an example of one suitable operating environment. Among other components not shown, operating environment 100 includes a number of user devices, such as user devices 102*a* and 102*b* through 102*n*, network 104, and server(s) 106. Each of the components shown in FIG. 1 may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment. User devices 102*a* through 102*n* can be any type of computing device capable of being operated by a user. For example, in some implementations, user devices 102*a* through 102*n* are the type of computing device described in relation to FIG. 8. By way of example and not limitation, a user device may be embodied as a personal computer (PC), a laptop computer, a mobile device, a smartphone, a tablet computer, a smart watch, a wearable computer, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 106 for geometry-aware contrast adjustments of a 2D image according to the present disclosure. In some implementations, the application(s) comprises a web application, which can run in a web browser, and could be hosted at least partially on the server-side of environment 100. In addition, or instead, the application(s) can comprise a dedicated application, such as an application having image editing functionality. In some cases, the application is integrated into the operating system (e.g., as a service and/or program). It is therefore contemplated herein that "application" be interpreted broadly. In some embodiments, the application may be integrated with geometry-aware image contrast system 108.

In accordance with embodiments herein, application 110 can facilitate geometry-aware contrast enhancement of a 2D image by combining, blending, or otherwise using an estimated AO map of the 2D image generated by geometry-aware image contrast system 108 residing in server 106 to create a more visually appealing 2D image. In particular, a 2D input image provided by application 110 sent over network 104 to server 106 and fed into a trained neural network implemented in geometry-aware image contrast system 108 to generate an estimated AO map of the 2D image. The generated AO map may be provided to application 110 on user device 102a through network 104. As such, the generated AO provided from server 106 to application 110 can be combined, blended, or otherwise used to adjust the contrast of the 2D input image in application 110.

As described herein, server 106 can facilitate providing an AO map for a geometry-aware contrast enhancement of a 2D image to a user via geometry-aware image contrast system 108. Server 106 includes one or more processors, and one or more computer-readable media. The computer-readable media includes computer-readable instructions executable by the one or more processors. The instructions may optionally implement one or more components of geometry-aware image contrast system 108, described in additional detail below. It should be appreciated that while geometry-aware image contrast system 108 is depicted as a single system, in embodiments, it can function as multiple systems capable of performing all the attributes of the system as described.

Geometry-aware image contrast system 108 generally provides an AO map of a 2D image to an application residing on a user device. Geometry-aware image contrast system 108 can be implemented to generate an estimated AO map of a 2D image or illustration based on the geometric information of content in the 2D image or illustration. In this regard, the generated AO map can be automatically generated without generating any 3D scene information of the 2D image in advance of feeding the 2D image into a trained neural network. The AO map may then be combined, blended, or otherwise used with the original input image to adjust the contrast of the image to create a more visually appealing image.

For cloud-based implementations, the instructions on server 106 may implement one or more components of geometry-aware image contrast system 108. Application 110 may be utilized by a user to interface with the functionality implemented on server(s) 106, such as geometry-aware image contrast system 108. In some cases, application 110 comprises a web browser. In other cases, server 106 may not be required, as further discussed with reference to FIG. 2. For example, the components of geometry-aware image contrast system 108 may be implemented completely on a user device, such as user device 102a. In this case, geometry-aware image contrast system 108 may be embodied at least partially by the instructions corresponding to application 110.

Thus, it should be appreciated that geometry-aware image contrast system 108 may be provided via multiple devices arranged in a distributed environment that collectively provide the functionality described herein. Additionally, other components not shown may also be included within the distributed environment. In addition, or instead, geometry-aware image contrast system 108 can be integrated, at least partially, into a user device, such as user device 102a. Furthermore, geometry-aware image contrast system 108 may at least partially be embodied as a cloud computing service.

Figure 2:
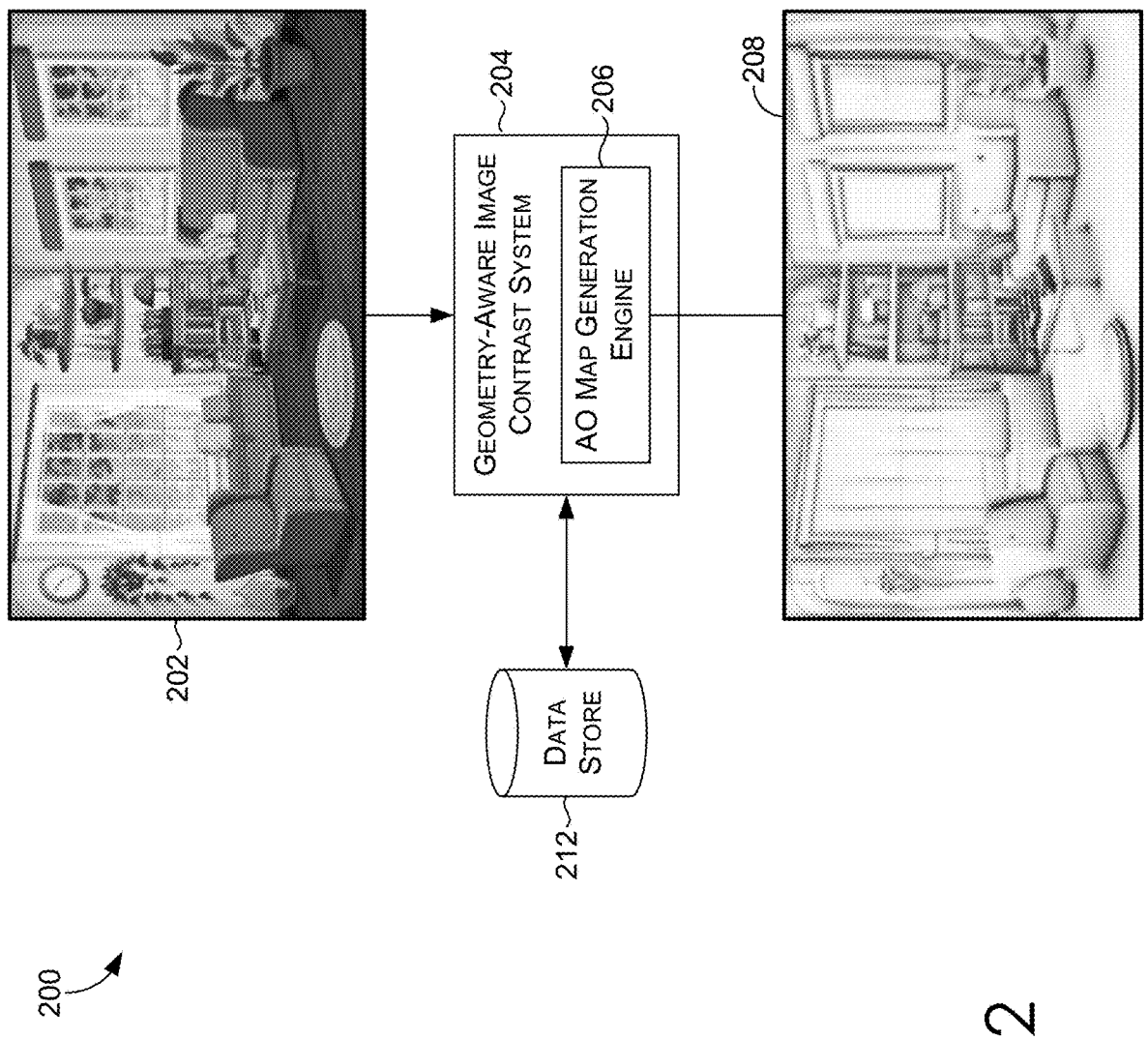
FIG. 2 is a block diagram of an exemplary computing system for geometry-aware image contrast adjustments to a 2D image, in accordance with embodiments of the present invention.

Referring to FIG. 2, a block diagram is provided showing an illustrative geometry-aware image contrast system environment 200 for generating an AO map for a 2D image or illustration using a trained neural network. Data store 212 can store computer instructions (e.g., software program instructions, routines, or services), data, and/or models used in embodiments described herein. In some implementations, data store 212 stores information or data used for training a neural network implemented in AO map generation engine 206. Although depicted as a single component, data store 212 may be embodied as one or more data stores. Further, the information in data store 212 may be distributed in any suitable manner across one or more data stores for storage (which may be hosted externally).

In embodiments, data stored in data store 212 includes collected images, pictures, illustrations, photographs, and other related image data for training, validating, testing, and optimizing a neural network. Image data generally refers to any information collected or generated from an image such as, but not limited to, 3D meshes, depth maps, normal maps, etc. Data store 212 also includes grayscale AO maps of each picture, illustration, photograph, or image stored in data store 212. In some cases, the images, pictures, illustrations, photographs, and other related image data are synthetic datasets generated from 3D scenes. For example, images and their corresponding AO maps may be generated from a given 3D scene model using any suitable known techniques (e.g., Autodesk Maya software). As an implementation example, given a 3D scene, a 2D image of the scene may be captured along with the corresponding AO map for the given image because the 3D scene information contains the necessary data to generate the AO map using a renderer. As a result, the captured 2D image and corresponding AO map may be stored in data store 210 for access by geometry-aware image contrast system 204.

Geometry-aware image contrast system 204 can generate an AO map from a 2D input image using a trained neural network that utilizes an image, image related data from data store 212, or any other data, associated with the image gathered by a business intelligence platform, analytics program(s), data provider, user device, application, or any other product or service. The image and image related data can be utilized by the system to train, validate, test, and optimize a neural network for generating an estimated AO map of a given 2D input image. As such, geometry-aware image contrast system 204 is capable of generating an AO map of a given 2D image that can be used to adjust the contrast of the 2D image to make the image appear more dynamic or lifelike.

As an overview, geometry-aware image contrast system 204 may receive a 2D image 202, analyze the image using a trained neural network, and generate an AO map that is a grayscale image of the 2D image indicating areas of the image that receive more or less ambient light based on the geometric content of the image. The generated AO map may be combined, blended, or otherwise used in conjunction with 2D image 202 to adjust the contrast of the image 202 because the AO map considers the geometric information of the content in the image.

In this way, to initiate generating an AO map for a 2D image based on the geometric information of the content in the image, geometry-aware image contrast system 204 can receive a 2D image 202. As contemplated in this disclosure, 2D image 202 can be any 2D photograph, illustration, drawing, or the like stored in any suitable format (e.g., JPEG, PNG, TIFF, BMP, GIF, etc.). In some cases, 2D image 202 may be automatically accessed by geometry-aware image contrast system 204. For instance, 2D image 202 can be accessed automatically when, for example, a user uploads or opens an image in image editing software (e.g., Adobe® Photoshop®). As another example, 2D image 202 may be accessed by geometry-aware image contrast system 204 when a user selects a UI tool to adjust the contrast of 2D image 202 in an application as mentioned in conjunction with at least FIG. 1. As such, 2D image 202 can be used to generate an AO map of the image, discussed further below, with reference to AO map generation engine 206.

Geometry-aware image contrast system 204 can include AO map generation engine 206. The foregoing components of geometry-aware image contrast system 204 can be implemented, for example, in operating environment 100 of FIG. 1. In particular, these components may be integrated into any suitable combination of user devices 102a and 102b through 102n and server(s) 106.

AO map generation engine 206 of geometry-aware image contrast system 204 is generally configured to generate an AO map of a 2D image 202 using a trained neural network. AO map generation engine 206 is initially trained, validated, tested, and optimized using data sets from data store 212. For example, in some instances, and as discussed in more detail at least in conjunction with FIG. 3, AO map generation engine 206 utilizes a convolutional neural network (CNN) that is trained using supervised learning techniques. Accordingly, the trained neural network can generate an AO map for any given 2D image without any 2D scene information generated in advance.

At a high level, the neural network utilized by AO map generation engine 206 is trained using supervised learning techniques. In embodiments, a synthetic dataset comprised of pairs of images and grayscale AO maps generated from a 3D graphics rendering application are used to train, validate, test, and optimize the neural network to generate an AO map for a given 2D image or illustration. Using a depth-map of a training image and a linearly decayed AO map blended with the training image, an AO map of the training image is generated. Subsequently, a discriminator is used to compare and determine whether the generated AO map or the ground truth AO map is the real one. To obtain an optimally trained neural network, the discriminator should designate the generated AO map as "real" and the ground truth AO map as "fake" as often as possible. Using the trained neural network, AO map generation engine 206 may provide AO map 208 based on the geometric information of content in 2D image 202.

Although not shown for clarity, once AO map 208 has been generated from 2D image 202, embodiments of the present invention may use AO map 208 in numerous ways. For example, AO map 208 may be sent, accessed, or otherwise used by any application or program suitable for editing images (e.g., Adobe® Photoshop®). In some cases, AO map 208 may be combined, blended, or otherwise used to adjust the contrast of 2D image 202 according to a user's preferences. It is contemplated that various UI tools for adjusting the AO of an image in accordance with embodiments of the present invention may be implemented in any image editing application, software, or program. For example, a sliding scroll bar may be implemented to adjust the AO of an image based on the positioning of the scroll bar (e.g., sliding the scroll bar to the right on a horizontal axis will magnify the AO while sliding the scroll bar to the left will reduce the AO shown in the image). As another example, up and down arrows (or left and right arrows) on a keyboard may be pushed to slowly change the AO. Other implementations contemplated for adjusting the AO of an image include clicking and dragging a mouse up and down (or left and right) to adjust the AO, turning a dial, or using any other similar UI tool. In other cases, a user may click a button that automatically adds the maximum amount of AO to an image using a generated AO map. Accordingly, embodiments of the present invention may be implemented or used in conjunction with any suitable software, program, or application for using an AO map generated by AO map generation engine 206 of geometry-aware image contrast system 204.

Figure 3:
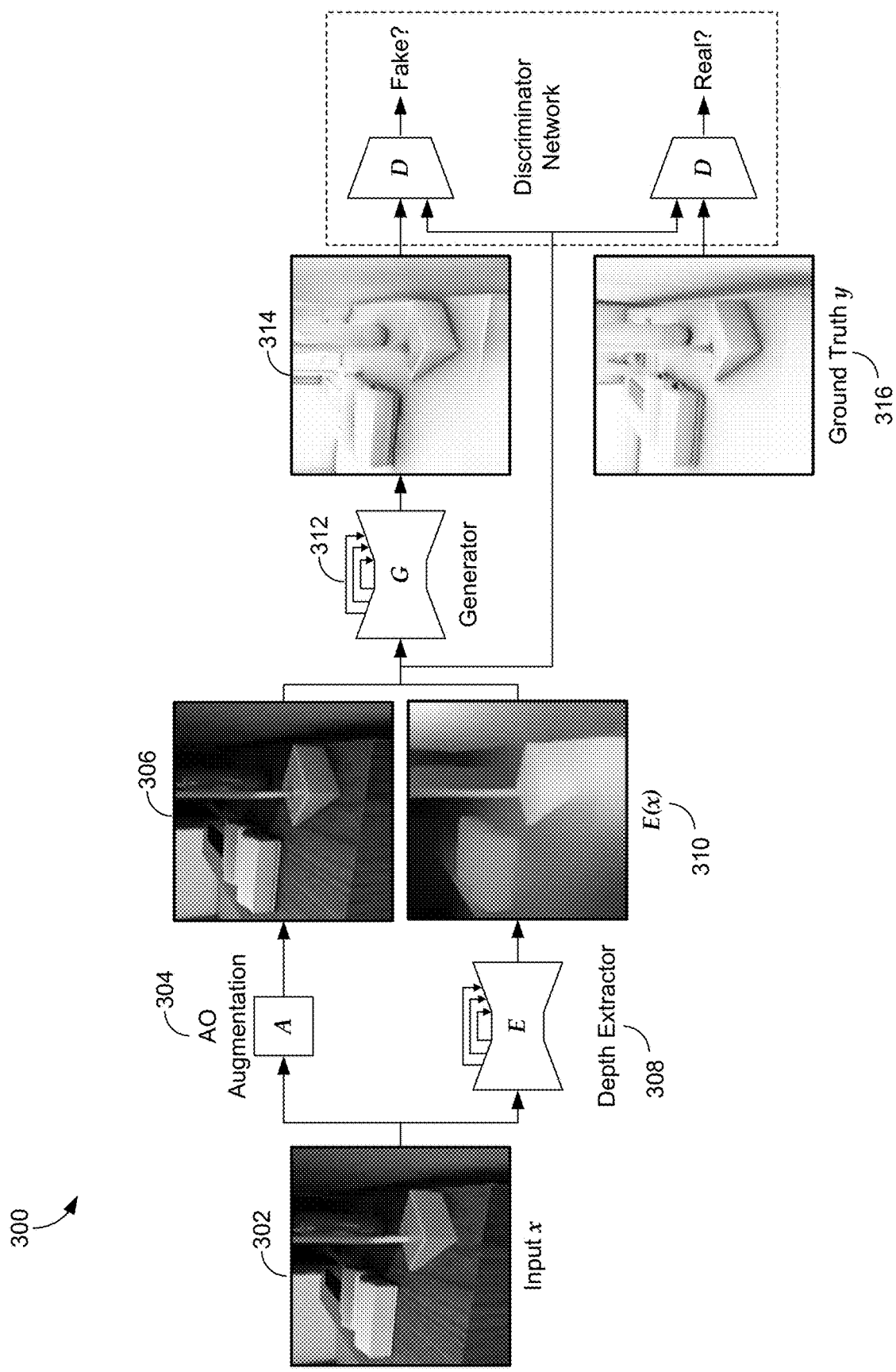
FIG. 3 is an exemplary flow diagram illustrating the architecture and training process of a neural network used for generating an AO map of a 2D image, in accordance with embodiments of the present invention.

Referring now to FIG. 3, an exemplary flow diagram illustrating the architecture and training process of a neural network used for generating an AO map of a 2D image is shown, in accordance with embodiments of the present invention. Embodiments of the present invention implement the architecture described below into geometry-aware image contrast system 108 and 204 as described in conjunction with at least FIGS. 1 and 2. To properly estimate an AO map for a given 2D image, embodiments of the present invention may use a variant of an hourglass network used for monocular depth estimation from a single 2D image. Additionally, in some instances, embodiments of the present invention may use an encoder-decoder architecture, which uses a variant of an inception module interleaved with skip-connections at multiple scales. However, it is contemplated that any suitable model architecture can be used for estimating the AO map of a given 2D image. As such, the network embodied by the present invention can be optimized using the process exemplified in FIG. 3.

Initially, before the training process exemplified in FIG. 3 can begin, a dataset must be collected for supervised learning of a convolutional neural network (CNN). As such, a synthetic dataset is manually collected to meet the training requirements for the CNN. To obtain a suitable dataset, pairs of RGB images and grayscale AO maps are gathered from 3D scene models using any suitable method process, technique, algorithm, software, etc. The 3D scene models can contain a variety of images that contain varying degrees of AO including indoor/outdoor images and photorealistic/non-photorealistic images. For example, in FIG. 3, input image 302 is an example of an RGB image obtained from a 3D scene model, and image 316 is an example of a ground truth AO map of input image 302. Accordingly, these two images may be combined to serve as a baseline for training embodiments of the present invention.

Subsequently, after collecting the proper training data, a single, fully-convolutional CNN generator network 312, G, can be trained using an input image 302, x, and a ground truth AO map 316, y. Embodiments of the present invention have two points in the CNN: an AO augmentation 304 and depth extractor network 308. At a high level, AO augmentation block 304 assists the network in estimating the AO of an image by enabling the network to work with different amounts of AO that are already included in a given input image. In other words, to synthesize an image with different levels of AO, embodiments of the present invention start from no AO included at all to a full amount of AO and synthesizing all possible AO variations in between. For example, input image 302 does not have any AO included in the content of the image but it is contemplated that input image 302, in some cases, may have various amounts of AO included in the image. To cover the varying degrees of AO included in an image, AO augmentation block 304 linearly decays ground truth AO map 316, y, and multiplies it with input image 302, x. Thus, given an input image and a ground truth AO map, (x, y), augmentation operation A(y) uses a randomly sampled parameter $s_{min}$ to linearly decay the ground truth AO map as shown in this equation: A(x, y)=$(s_{min}+(1.0-s_{min})$*y) x. In some cases, the range of $s_{min}$ is manually defined using a validation subset. In other cases, the range of $s_{min}$ is automatically defined using a pre-defined validation parameter. To cover the instance where there is no AO in an input image, A(y) is set equal to 1.0 to perform no AO augmentation of the image. Iterating through the various AO augmented images, embodiments of the present invention may select the best estimated AO augmented image as input into generator network 312. As a result, AO augmented image 306 represents an improved version of input image 302 with added AO and may be combined with a generated depth map 310 as input into generator network 312 for generating an estimated AO map.

In addition to AO augmentation block 304, depth extractor network 308, E, is used to provide depth guidance for generator network 312, G. Providing depth guidance using depth extractor network 308 enables generator network 312 to perform better and is easier to train using a depth-map as an additional hint. Because prior information about the 3D geometry of a 2D image helps estimate the AO for a 2D image, embodiments of the present invention use a trained depth extractor network 308 to extract the coarse depth of an input image using a monocular depth estimation model which is designed to generalize the depth of a scene. While the extracted depth map 310 is a rough estimate of the depth of input image 302, it does capture long-range AO caused by large elements or content in input image 302 and allows generator network 312 to make more accurate AO estimations. As such, the depth of input image 302 can be extracted and is shown as depth map 310, E(x), and combined with an AO augmented image as input into generator network 312.

After generating AO augmented image 306 and depth map 310, both images may be combined into a single image and used as input to generator network 312 to estimate the AO map of input image 302 to produce an estimated AO map 314. Using a generative adversarial network (GAN) training process to train the generator network 312, embodiments of the present invention utilize loss functions to optimize generator network 312 by using the AO augmented image 306 combined with the depth map 310 as input into generator network 312 as represented by the following equation: x*=(A(y)*x,E(x)).

Embodiments of the present invention also optimize generator network 312 by using a discriminator network D to determine whether estimated AO map 314 or ground truth AO map 316 is the one generated by generator network 312 by comparing with the single combined input image from the depth map 310 and the AO augmented image 306. Using a GAN training process, the discriminator network contains two discriminator components, with a common input into both (e.g., the combined input image fed into generator network 312). The goal is for generator network 312 to generate an AO map that increases the error rate of the discriminator network D. In other words, the more often the discriminator network classifies the generated AO map 314 as the "real" image, the better generator network 312 competes with the discriminator, the better generator network 312 will perform generating an optimized AO map.

Using typical loss functions in conjunction with the discriminator network, embodiments of the present invention iteratively optimize generator network 312. First, a typical loss function represented by the following equation is used for adversarial learning and training of generator network 312: $L_{GAN}(G, D)=\mathbb{E}_{(x^*,y)}[\log D(x^*,y)]+\mathbb{E}_{x^*}[\log(1-D(x^*,G(x^*)))]$. Second, a feature matching loss function is used via the intermediate layers of the discriminator D. As a result, the feature matching loss is calculated as follows:

$$L_{FM}(G, D) = \mathbb{E}_{(x^*,y)}\sum_{i=1}^{T}[\|D^i(x^*, y) - D^i(x^*, G(x^*))\|_1],$$

where $D^i$ denotes the i-th layer feature extractor of discriminator D, T is the total number of layers, and $N_i$ denotes the number of elements in each layer. After calculating the loss for adversarial learning and the feature matching loss, the following equation represents the optimization of generator network 312 using a discriminator network:

$$\min_G\left(\max_D(L_{GAN}(G, D)) + \lambda L_{FM}(G, D)\right).$$

Accordingly, the trained and optimized generator network 312 is implemented into the geometry-aware contrast system as described in FIGS. 1 and 2. As such, the generator network 312 is able to receive a 2D image or illustration and generate an estimated AO map that can be used to adjust the AO of the 2D image or illustration.

Figure 4A:
FIG. 4A is an exemplary 2D image illustrating an image before a geometry-aware contrast adjustment, in accordance with embodiments of the present invention.
Figure 4B:
FIG. 4B is an exemplary 2D image illustrating an image with an geometry-aware contrast adjustment, in accordance with embodiments of the present invention.
Figure 4C:
FIG. 4C is an exemplary 2D image illustrating an image with a normal contrast adjustment at the same scale as the geometry-aware contrast adjustment in FIG. 4B, in accordance with embodiments of the present invention.

Turning now to FIGS. 4A-4C, FIG. 4A is an exemplary 2D image illustrating an image before a geometry-aware contrast adjustment, FIG. 4B is an exemplary 2D image illustrating an image with a maximum geometry-aware contrast adjustment, and FIG. 4C is an exemplary 2D image illustrating an image with a maximum contrast adjustment using a typical contrast adjustment technique at the same scale as the geometry-aware contrast adjustment in FIG. 4B. As shown, the image in FIG. 4A is a 2D illustration that a user created using any suitable image editing software. Embodiments of the present invention, and as described above in conjunction with FIGS. 1-3, generate an AO map for a 2D illustration (e.g., see AO map 208 of FIG. 2). Using the generated AO map, embodiments of the present invention can make geometry—aware contrast adjustments to FIG. 4A as shown in FIG. 4B. For example, areas 402, 404, and 406 demonstrate where the AO has increased compared to the corresponding areas in FIG. 4A. Area 402 in FIG. 4B shows the cracks between the couch cushions exposed to less ambient light and, as a result, the cracks having darker shading. Area 404 in FIG. 4B shows the area between the window and the wall receiving less ambient light and, as a result, the right side of outer part of the window having darker shading. As a further example, area 406 in FIG. 4B shows the area between the rug and the floor receiving less ambient light and, as a result, the area between the rug and the floor has darker shading. Accordingly, adjusting the AO of the image in FIG. 4B makes the image appear more dynamic and realistic compared to the original image in FIG. 4A with no added AO.

Referring now to FIG. 4B and FIG. 4C, the difference between a normal contrast adjustment and a geometry-aware contrast adjustment is shown. As displayed, FIG. 4C demonstrates a maximum increase in the contrast of the original image in FIG. 4A. The regular contrast increase makes the black areas darker and the white areas brighter resulting in a less realistic image. For example, the walls and areas surrounding the windows are extraordinarily bright compared to the rest of the image. Comparatively, the contrast of the image in FIG. 4B is increased based on the 3D geometric information of content in the image and as a result of an AO map generated by geometry-aware image contrast system 108 and 204, as discussed in conjunction with at least FIGS. 1-3. As a result, the image in FIG. 4B is more visually appealing than the image in FIG. 4C with a maximum increase of contrast.

As shown in FIGS. 4B and 4C, a sliding scroll bar in FIG. 4B represents one implementation of adjusting the geometry-aware contrast for a 2D image or 2D illustration. For example, FIG. 4B shows a maximum geometry-aware contrast adjustment by emphasizing areas receiving less ambient light. In some cases, the contrast can be reduced by sliding the scroll bar incrementally to the left so that areas such as 402, 404, and 406 are not emphasized to the maximum degree, resulting in a lighter shading between objects receiving less ambient light based on 3D geometric information in the image. The sliding scroll bar in FIG. 4C operates in a similar manner to FIG. 4B except that the traditional contrast adjustment techniques are used to adjust the contrast of the image without adjusting the AO.

Figure 5A:
FIG. 5A is an exemplary 2D composite image illustrating an image before a geometry-aware contrast adjustment, in accordance with embodiments of the present invention.

Turning now to FIG. 5A, FIG. 5A is an exemplary 2D composite image illustrating an image before a geometry-aware contrast adjustment, in accordance with embodiments of the present invention. FIG. 5A is an image that is made from a combination of multiple images merged into a single surface. For example, the background image including a road and city are a part of one image, and the car is a separate image that was merged onto the road to make a composite image that looks natural. Because the two images were separate, simply merging the car image on top of the background image appears to look unnatural since there are no AO effects (e.g., shading and shadows) added to the image.

Figure 5B:
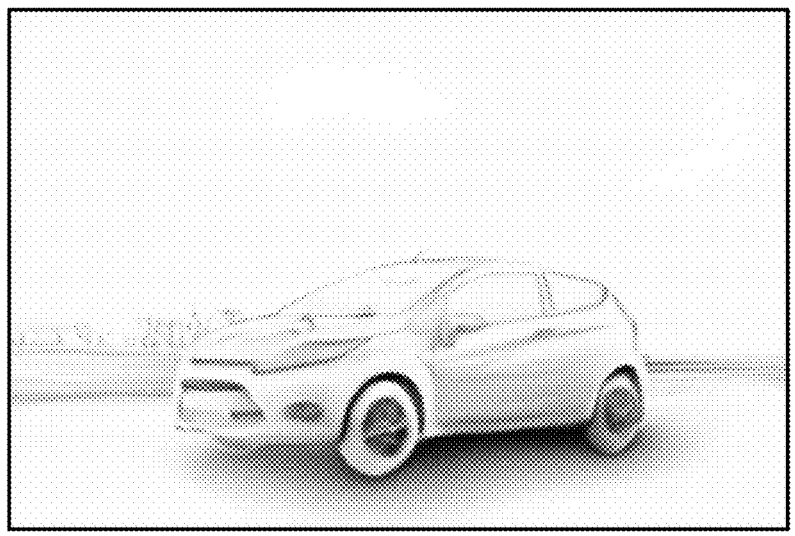
FIG. 5B is an exemplary 2D image illustrating an AO map of the composite image illustrated in FIG. 5A, in accordance with embodiments of the present invention.
Figure 5C:
FIG. 5C is an exemplary 2D image illustrating an image with a geometry-aware contrast adjustment applied to the image in FIG. 5A based on the AO map in FIG. 5B, in accordance with embodiments of the present invention.

To adjust the AO of FIG. 5A to make the composite image appear more realistic and cohesive, embodiments of the present invention generate an estimated AO map of the composite image using methods and techniques described above in conjunction with at least FIGS. 1-3. As shown in FIG. 5B, a grayscale AO map of the composite image in FIG. 5B represents the estimated AO of the image in FIG. 5A. The result of combining, blending, or otherwise adding a degree of AO to FIG. 5A based on the estimated AO map in FIG. 5B is shown in FIG. 5C. As shown in FIG. 5C, areas 402 and 404 show two exemplary areas where shading has been added to the image in FIG. 5A based on the AO map in FIG. 5B to generate the composite image in FIG. 5C. Noticeably, areas 402 and 404 between the car and the road, have darker shading and shadows added in FIG. 5C based on the AO map of FIG. 5B. As a result of adding AO to the original composite image in FIG. 5A, the AO adjusted composite image in FIG. 5C looks much more natural, cohesive, and realistic.

Example Flow Diagrams

Figure 6:
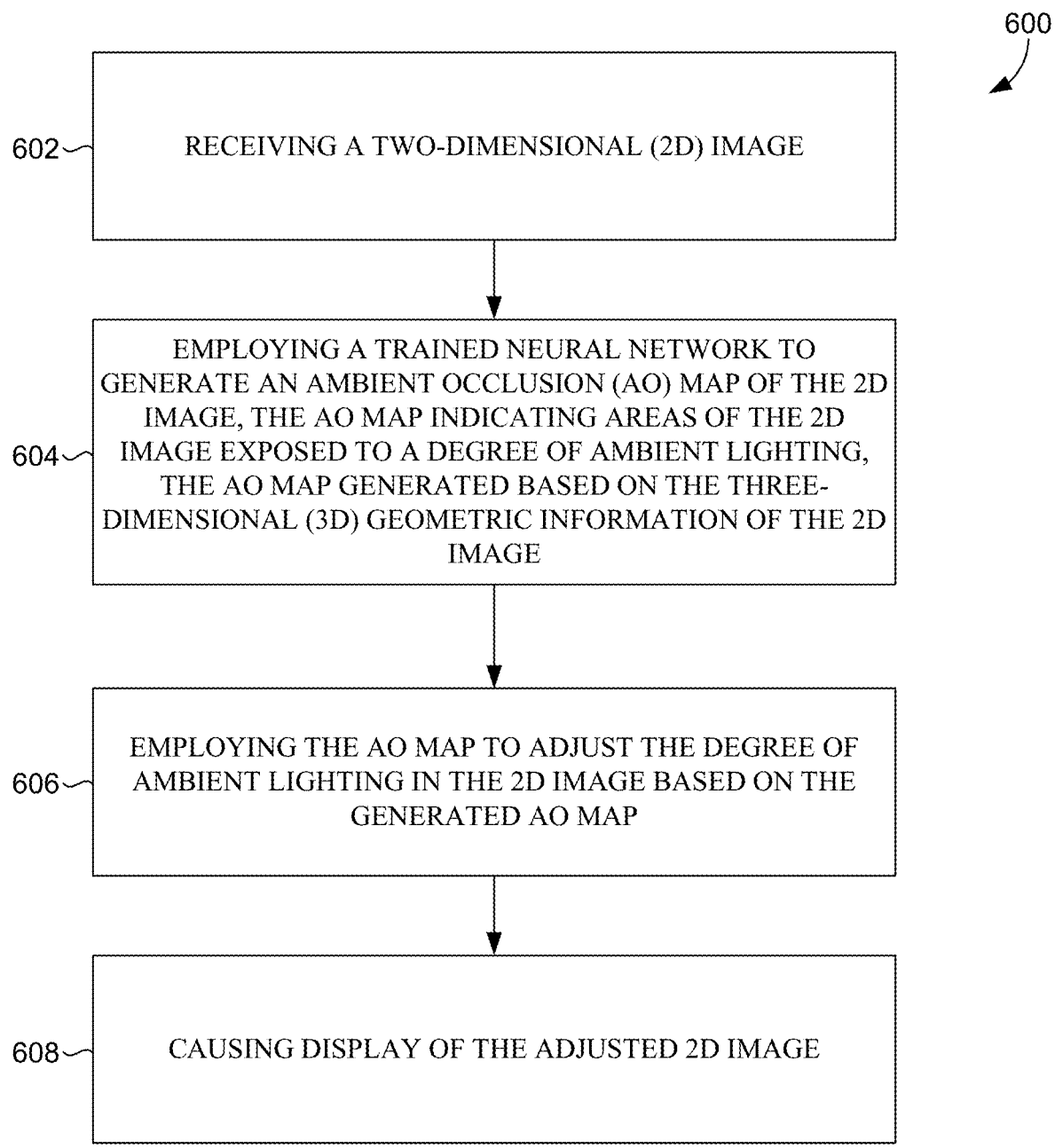
FIG. 6 is a flow diagram showing a method for independent claim 1, in accordance with embodiments of the present invention.
Figure 7:
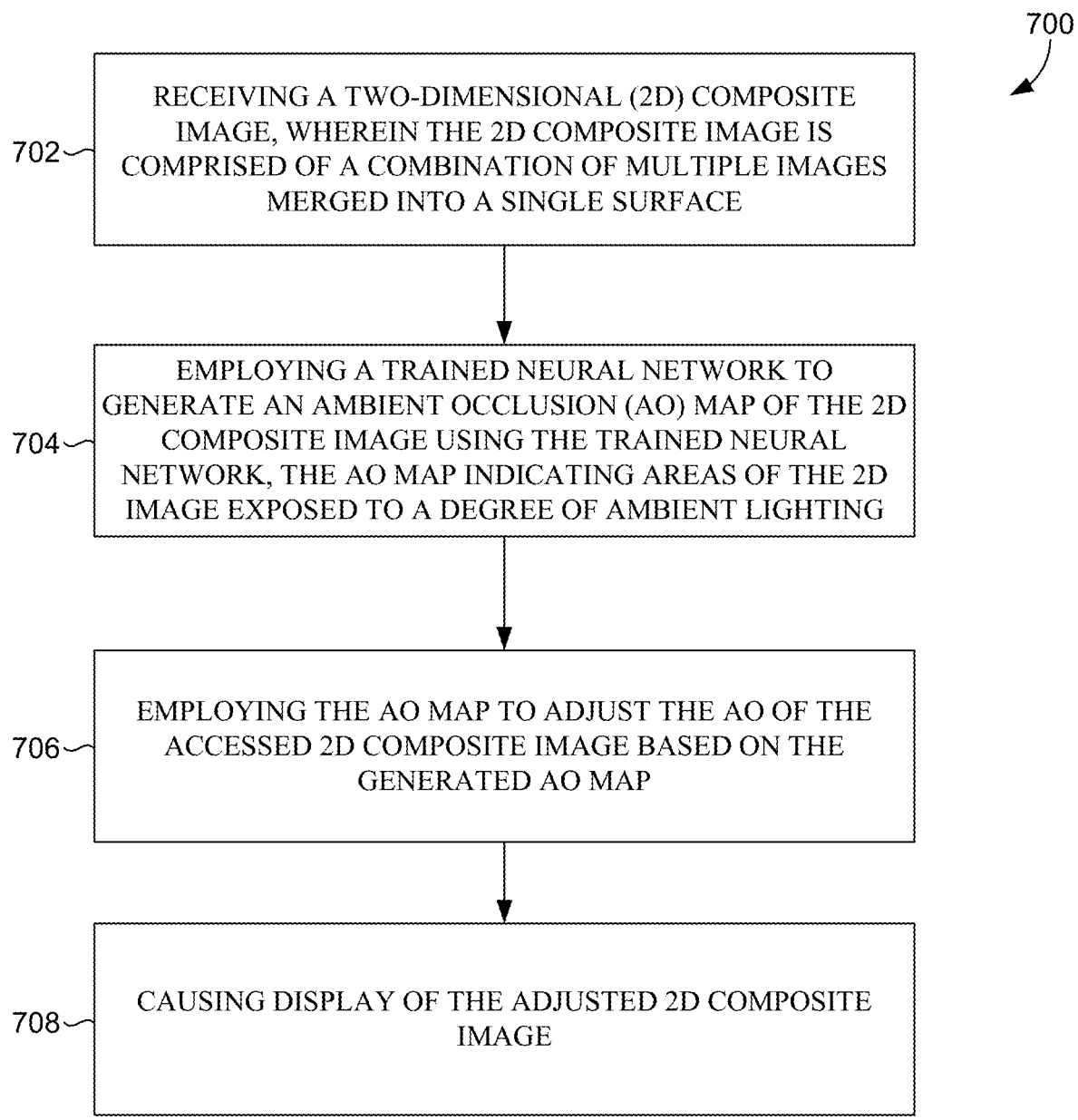
FIG. 7 is a flow diagram showing a method for independent claim 2, in accordance with embodiments of the present invention.

With reference now to FIGS. 6 and 7, flow diagrams are provided illustrating methods 600 and 700 for providing product recommendations. Each block of methods 600 and 700, and any other methods described herein, comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The methods 600 and/or 700 may be implemented by geometry-aware image contrast system 204 as described in conjunction with at least FIGS. 1-5.

Turning initially to FIG. 6, FIG. 6 illustrates a method 600, in accordance with embodiments described herein. Method 600 can be performed, for instance, by geometry-aware image contrast system 204 using AO map generation engine 206 of FIG. 2. Initially, as shown at block 602, a two-dimensional (2D) image is received. At block 604, a trained neural network is employed to generate an ambient occlusion (AO) map of the received 2D image. The AO map indicates areas of the 2D image that are exposed to a degree of ambient lighting. Additionally, the AO map is generated based on the three-dimensional (3D) geometric information of the 2D image. At block 606, the AO map is employed to adjust the degree of ambient lighting in areas of the 2D image based on the generated AO map. At block 608, the adjusted 2D image is displayed.

Referring now to FIG. 7, FIG. 7 illustrates a method 700, in accordance with embodiments described herein. Method 700 can be performed, for instance, by geometry-aware image contrast system 204 using AO map generation engine 206 of FIG. 2. Initially at block 702, a two-dimensional (2D) composite image is received. The 2D composite image being comprised of a combination of multiple images merged into a single surface. At block 704, a trained neural network is employed to generate an ambient occlusion (AO) map of the 2D composite image using the trained neural network, the AO map indicating areas of the 2D image exposed to a degree of ambient lighting. At block 706, the AO map is employed to adjust the AO of the areas of the accessed 2D composite image based on the generated AO map. At block 708, the adjusted 2D composite image is displayed.

Example Operating Environment

Figure 8:
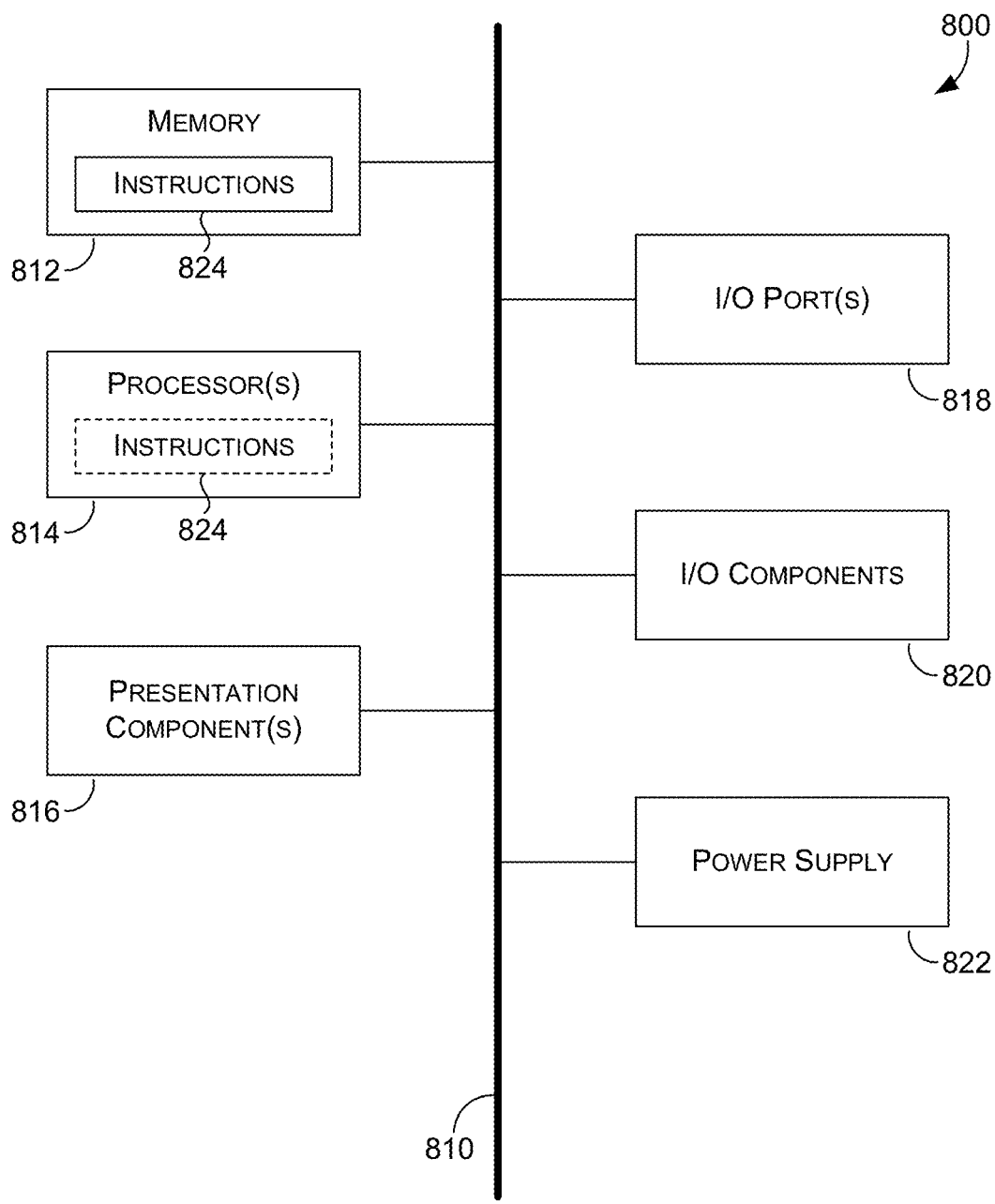
FIG. 8 is a block diagram of an exemplary operating environment in which embodiments of the present invention may be employed.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8 computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of non-transitory computer-readable media. Non-transitory computer-readable media can be any available media that can be accessed by computing device 800 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes non-transitory computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

What is claimed is:

1. A method comprising:
generating an ambient occlusion (AO) map of a two dimensional (2D) image using a neural network trained on at least one AO image generated by multiplying a training image with a decayed ground truth AO map of the training image; and
executing an operation for adjusting the 2D image using the AO map.

2. The method of claim 1, the neural network trained based on combining the at least one AO image with a depth map, extracted from the training image, as input into the neural network.

3. The method of claim 1, wherein the operation for adjusting the 2D image using the AO map comprises employing the AO map to adjust a degree of ambient lighting in the 2D image.

4. The method of claim 1, wherein the operation for adjusting the 2D image using the AO map comprises combining the AO map with a 2D composite image.

5. The method of claim 1, wherein the operation for adjusting the 2D image using the AO map comprises one of increasing or decreasing an amount of AO in the 2D image.

6. The method of claim 1, wherein the operation for adjusting the 2D image using the AO map is in response to user input designating an amount of ambient lighting in the 2D image.

7. The method of claim 1, further comprising generating the training image based on a graphics engine rendering of a three-dimensional (3D) scene.

8. A non-transitory computer-readable medium storing executable instructions, which when executed by a processing device, cause the processing device to perform operations comprising:
generating an ambient occlusion (AO) map of a two dimensional (2D) composite image, that merges multiple images into a single image, using a neural network trained on at least one AO image generated by multiplying a training image with a decayed ground truth AO map of the training image; and
executing an operation for adjusting the 2D composite image using the AO map.

9. The non-transitory computer-readable medium of claim 8, the neural network trained based on combining the at least one AO image with a depth map, extracted from the training image, as input into the neural network.

10. The non-transitory computer-readable medium of claim 8, wherein the operation for adjusting the 2D composite image using the AO map comprises employing the AO map to adjust a degree of ambient lighting in the 2D composite image.

11. The non-transitory computer-readable medium of claim 8, wherein the operation for adjusting the 2D composite image using the AO map comprises one of increasing or decreasing an amount of AO in the composite 2D image.

12. The non-transitory computer-readable medium of claim 8, wherein the operation for adjusting the 2D composite image using the AO map is in response to user input designating an amount of ambient lighting in the 2D composite image.

13. The non-transitory computer-readable medium of claim 8, the operations further comprising generating the training image based on a graphics engine rendering of a three-dimensional (3D) scene.

14. A computing system comprising:

a memory component; and a processing device coupled to the memory component, the processing device to perform operations comprising:

receiving into a neural network at least one ambient occlusion (AO) image generated by multiplying a training image with a decayed ground truth AO map of the training image; and training the neural network based on ambient occlusion (AO) to generate a trained neural network configured to generate an AO map of a two dimensional (2D) image.

15. The computing system of claim 14, the operations further comprising training the neural network based on combining the at least one AO image with a depth map, extracted from the training image, as input into the neural network.

16. The computing system of claim 14, the operations further comprising using the AO map to adjust a degree of ambient lighting in the 2D image.

17. The computing system of claim 14, the operations further comprising adjusting the 2D image using the AO map based on combining the AO map with a 2D composite image.

18. The computing system of claim 14, the operations further comprising adjusting the 2D image using the AO map to increase or decrease an amount of AO in the 2D image.

19. The computing system of claim 14, the operations further comprising adjusting the 2D image using the AO map in response to user input designating an amount of ambient lighting in the 2D image.

20. The computing system of claim 14, the operations further comprising generating the training image based on a graphics engine rendering of a three-dimensional (3D) scene.

* * * * *